United States Patent
De'Longhi et al.

(10) Patent No.: US 10,362,897 B2
(45) Date of Patent: Jul. 30, 2019

(54) CONTROL CIRCUIT FOR SELF-TURN-OFF OF AN AUTOMATIC MACHINE

(71) Applicant: De'Longhi Appliances S.R.L., Treviso (IT)

(72) Inventors: Giuseppe De'Longhi, Treviso (IT); Paolo Evangelisti, Bologna (IT); Andrea Zottarel, San Dona' di Piave (IT)

(73) Assignee: De'Longhi Appliances S.R.L., Treviso (IT)

( * ) Notice: Subject to any disclaimer, the term of this patent is extended or adjusted under 35 U.S.C. 154(b) by 289 days.

(21) Appl. No.: 14/414,712

(22) PCT Filed: Jul. 15, 2013

(86) PCT No.: PCT/EP2013/064947
§ 371 (c)(1),
(2) Date: Jan. 14, 2015

(87) PCT Pub. No.: WO2014/012903
PCT Pub. Date: Jan. 23, 2014

(65) Prior Publication Data
US 2015/0216356 A1 Aug. 6, 2015

(30) Foreign Application Priority Data
Jul. 17, 2012 (IT) .............. MI2012A1239

(51) Int. Cl.
*H05B 1/02* (2006.01)
*A47J 31/58* (2006.01)
(Continued)

(52) U.S. Cl.
CPC ............. *A47J 31/58* (2013.01); *G05B 15/02* (2013.01); *H01H 43/00* (2013.01); *H01H 51/00* (2013.01); *H05B 1/0269* (2013.01)

(58) Field of Classification Search
CPC ......... A47J 31/58; G05B 15/02; H01H 43/00; H01H 51/00; H05B 1/0269
(Continued)

(56) References Cited

U.S. PATENT DOCUMENTS 3,578,125 A * 5/1971 Marlet Barrera ....... A47J 31/40
194/246
3,713,377 A * 1/1973 Arnett ................... A47J 31/057
99/283
(Continued)

FOREIGN PATENT DOCUMENTS

CN 201055295 5/2008
EP 0362954 4/1990
(Continued)

OTHER PUBLICATIONS

Rod Elliott, Relays, Selection & Usage (Part 1), Dec. 2014, pp. 1-33.*
(Continued)

*Primary Examiner* — Tu B Hoang
*Assistant Examiner* — Vy T Nguyen
(74) *Attorney, Agent, or Firm* — Blank Rome LLP

(57) ABSTRACT

A control circuit, connectable to a domestic power line (L1, L2), includes a logic controller (1), a power supply (2) for the logic controller (1), at least one control switch (3) for an electrical load (4, 5) connected to the logic controller (1), and an electrically actuated deviator (6) connected to the logic controller (1). The deviator (6) is switchable between a machine activation status, where a main power line (7) of the power supply (2) is connected to the domestic power line (L1, L2), and a machine deactivation status, where a secondary power line (8) of the power supply (2) is connected to the domestic power line (L1, L2), having a normally open switch (9) connected to the logic controller (1), and energy
(Continued)

storage that maintains power supply to the logic controller (1) for an operating time of the deviator (6) switching.

9 Claims, 2 Drawing Sheets

(51) Int. Cl.
    *G05B 15/02* (2006.01)
    *H01H 43/00* (2006.01)
    *H01H 51/00* (2006.01)

(58) Field of Classification Search
    USPC .............................. 99/281; 301/116; 219/492
    See application file for complete search history.

(56) References Cited

U.S. PATENT DOCUMENTS

| | | | | |
|---|---|---|---|---|
| 3,872,781 A * | 3/1975 | Helbling | ............... | A47J 31/007 |
| | | | | 99/282 |
| 4,122,763 A * | 10/1978 | Waninger | ............ | A47J 31/0573 |
| | | | | 340/608 |
| 4,134,332 A * | 1/1979 | Merman | ............... | A47J 31/408 |
| | | | | 210/400 |
| 4,214,148 A * | 7/1980 | Fleischhauer | ......... | A47J 31/545 |
| | | | | 219/506 |
| 4,330,702 A * | 5/1982 | Cheng | .................... | A47J 31/52 |
| | | | | 219/442 |
| 4,494,314 A * | 1/1985 | Gell, Jr. | ................. | A23N 12/08 |
| | | | | 219/502 |
| 4,624,395 A * | 11/1986 | Baron | ................... | A47J 31/401 |
| | | | | 222/129.1 |
| 4,667,584 A * | 5/1987 | Koyama | ............... | A47J 31/106 |
| | | | | 99/280 |
| 5,001,969 A * | 3/1991 | Moore | .................... | A47J 31/52 |
| | | | | 219/492 |
| 5,044,261 A * | 9/1991 | Kawazoe | ................ | A47J 31/42 |
| | | | | 219/483 |
| 5,183,998 A * | 2/1993 | Hoffman | ................. | A47J 31/52 |
| | | | | 219/492 |
| 5,195,422 A * | 3/1993 | Newnan | ................ | A47J 31/402 |
| | | | | 99/283 |
| 5,455,887 A * | 10/1995 | Dam | .................... | A47J 31/0573 |
| | | | | 219/491 |
| 5,715,742 A * | 2/1998 | Cheich | ................ | A47J 31/0615 |
| | | | | 99/300 |
| 5,778,765 A * | 7/1998 | Klawuhn | ................ | A47J 31/46 |
| | | | | 99/290 |
| 6,006,653 A * | 12/1999 | Sham | .................. | A47J 31/4439 |
| | | | | 99/280 |
| 7,891,287 B2 * | 2/2011 | Miller | ................ | A47J 41/0016 |
| | | | | 99/282 |
| 2004/0112224 A1 * | 6/2004 | Drobeck | ............... | A47J 31/402 |
| | | | | 99/279 |
| 2006/0232139 A1 * | 10/2006 | Mullin | ................ | H03K 17/296 |
| | | | | 307/116 |
| 2007/0261565 A1 * | 11/2007 | Reyhanloo | ............ | A47J 31/545 |
| | | | | 99/280 |
| 2009/0183639 A1 * | 7/2009 | Quah | .................... | A47J 31/402 |
| | | | | 99/282 |

FOREIGN PATENT DOCUMENTS

| | | | | |
|---|---|---|---|---|
| EP | 1854386 | | 11/2007 | |
| EP | 2255704 | | 12/2010 | |
| EP | 2257118 | | 12/2010 | |
| WO | WO-0001284 A1 * | 1/2000 | .............. | A47J 31/36 |

OTHER PUBLICATIONS

International Search Report dated Jun. 24, 2014; International Application No. PCT/EP2013/064947; International Filing Date: Jul. 15, 2013; 4 pages.

Written Opinion dated Jun. 24, 2014; International Application No. PCT/EP2013/064947; International Filing Date: Jul. 15, 2013; 6 pages.

English translation of China Application No. CN201055295; 6 pages.

English translation of European Application No. EP1854386; 18 pages.

* cited by examiner

CONTROL CIRCUIT FOR SELF-TURN-OFF OF AN AUTOMATIC MACHINE

RELATED APPLICATIONS

This application is a U.S. national phase application of International Application No. PCT/EP2013/064947, filed Jul. 15, 2013, which application claims priority to Italy Application No. MI2012A 001239, filed Jul. 17, 2012.

FIELD OF USE

The present invention relates to a control circuit for self-turn-off of an automatic machine, particularly for the production of a coffee-based drink.

BACKGROUND OF THE INVENTION

In the control circuits of some traditional types of automatic coffee machines, the self-turn-off function can be automatically activated through a special logic controller supplied by an electric power circuit on which an electric power supply deviator can be installed piloted by the logic controller itself.

In some known solutions wherein low voltage power supply of the logic controller is envisaged, the electric power supply of the controller has a transformer inside it that can lower the high input voltage in order to make it compatible with the low output voltage for the logic controller itself One of the drawbacks that can arise consists of the fact that the logic controller stops working if it is not appropriately supplied during the time needed for the deviator to switch. This occurs because the low output voltage is lacking in the transformer at the same time as the high input voltage is lacking.

SUMMARY OF THE INVENTION

The technical task of the present invention is, therefore, to realise a control circuit for self-turn-off particularly for an automatic coffee machine, which obviates the above-described technical drawbacks of the prior art.

Within the scope of this technical task, an object of the invention is that of realising a control circuit for self-turn-off, particularly of an automatic coffee machine, which ensures the necessary continuity of the electrical energy supply to the logic controller for the implementation of its functions.

Another object of the invention is that of realising a control circuit for self-turn-off particularly of an automatic coffee machine with simple and reliable operation.

The technical task, as well as these and other objects, according to the present invention are reached by realising a control circuit for self-turn-off of an automatic machine, connectable to a domestic electric voltage power line, characterised in that it comprises a logic controller having low supply electric voltage, a power supply of the logic controller, at least one switch to control at least one electrical load of the machine, said at least one switch being connected to the logic controller, an electrically actuated deviator connected to the logic controller and switchable between machine activation status, in which it connects a main electric power line of the power supply to the power line, and machine deactivation status, in which it connects a secondary electric power line of the power supply to the power line, said secondary electric power line having a normally open reactivation switch activatable by a manual reactivation button of the machine, said normally open reactivation switch being connected to the logic controller, and electrical energy storage means for maintaining the electric power supply of the logic controller for the entire operating time of the deviator switching from machine deactivation status to activation status, said switching being automatically generated by the closure of the reactivation switch.

One of the main advantages of the self-turn-off circuit is offered by the storage means, preferably comprising at least one condenser, which guarantee the supply of electrical energy for the low voltage supply of the logic controller for the entire time needed for the switching of the deviator from the deactivation status to the activation status of the machine.

Further characteristics of the present invention are also defined in the following claims.

BRIEF DESCRIPTION OF THE DRAWINGS

Further characteristics and advantages of the invention will more fully emerge from the description of a preferred but not exclusive embodiment of the control circuit for self-turn-off particularly of an automatic coffee machine according to the invention, illustrated by way of non-limiting example in the accompanying drawings, in which.

DETAILED DESCRIPTION OF THE ILLUSTRATED EMBODIMENTS

Figure 1:
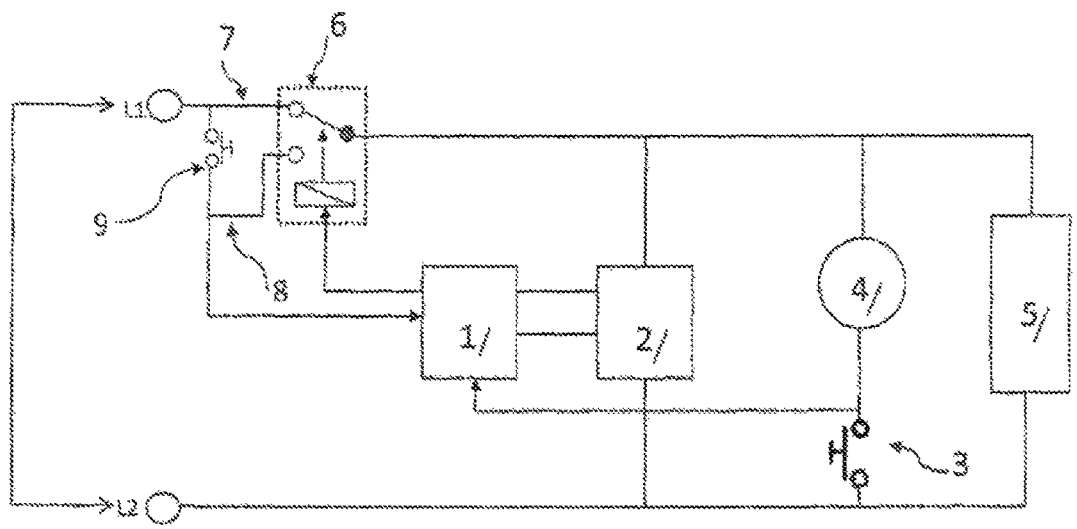
FIG. 1 schematically shows the control circuit for self-turn-off of an automatic coffee machine, wherein the deviator is in the activation status of the machine.

With reference to the figures mentioned, a control circuit is shown, particularly but not necessarily for the self-turn-off of an automatic coffee machine.

The control circuit can be connected to a high electric voltage power line with phases L1, L2, and comprises a logic controller 1 having a low supply electric voltage, a power supply 2 of the logic controller 1 having a converter of the high voltage of the power line to the low power supply voltage of the logic controller 1, at least one control switch 3 of at least one electrical load 4, 5 of the machine in communication with the logic controller 1, and an electrically actuated deviator 6.

The deviator 6 is switchable between a machine activation status, in which it connects a main electric power line 7 of the power supply 2 and the coffee machine to the power line, and machine deactivation status, in which it connects a secondary electric power line 8 of the power supply 2 to the power line, having a normally open reactivation switch 9 activatable by a manual reactivation button of the machine.

The power supply 2 can advantageously have reduced dimensions since it must supply electrical energy only to the logic controller 1.

The deviator 6 may comprise a two-position relay, or an electronic triac power circuit for alternating voltage.

The switch 9 is activatable through a relevant button, for example a single unipolar button.

The logic controller 1 preferably comprises an electronic board having a low supply electric voltage, for example, 5 V.

The electronic board, in which the internal operating logic of the machine is stored, is electrically connected to the deviator 6, to the switch 9 activatable by the manual reactivation button of the machine, and to the switch 3, and can both pilot the deviator 6 and read the switch 3. In the specific case in which an automatic coffee machine is described, the electrical loads 4 and 5 are represented by a brewing water circulation pump and a boiler with a thermostat for heating the brewing water.

Advantageously the control circuit further comprises electrical energy storage means for maintaining the electric power supply of the logic controller 1 for the entire operating time of the deviator 6 switching, automatically generated by the closure of the reactivation switch 9, from machine deactivation status to activation status.

Figure 2:
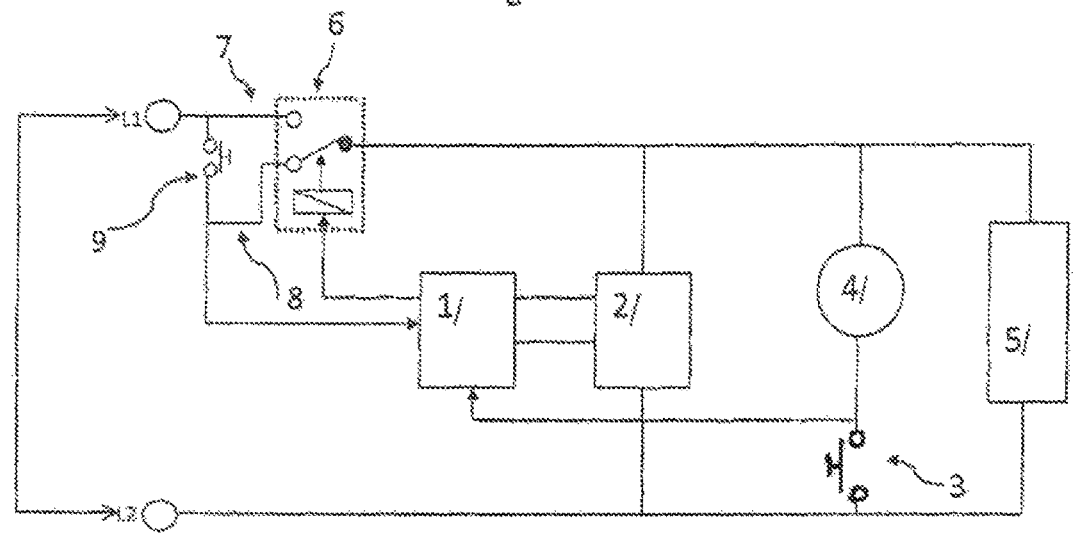
FIG. 2 schematically shows the control circuit of FIG. 1, wherein the deviator is in the deactivation status of the machine.
Figure 3:
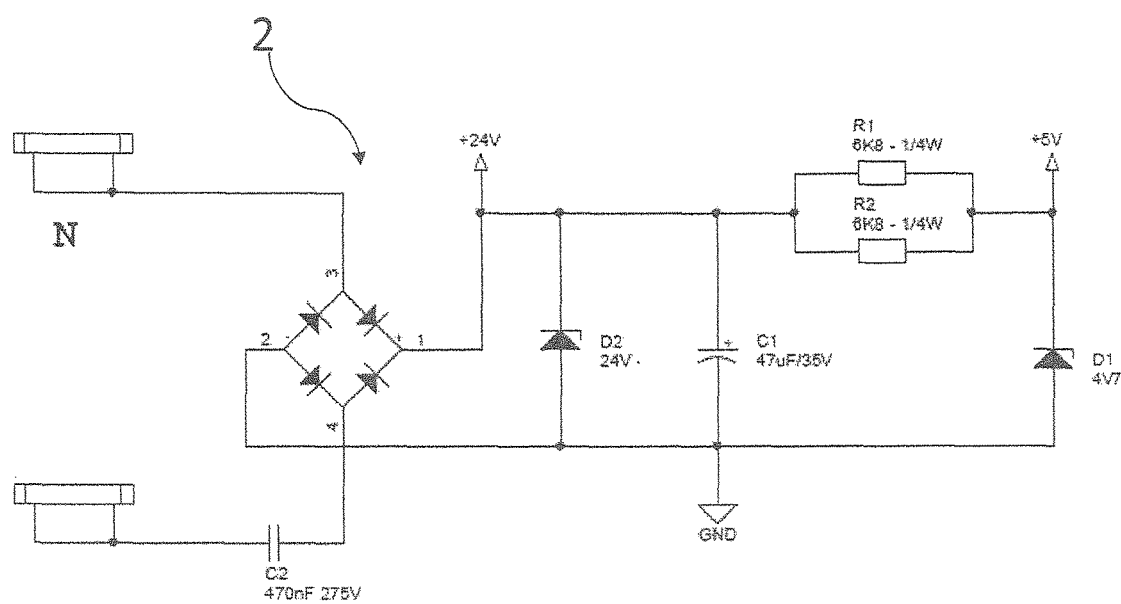
FIG. 3 shows the wiring diagram of a preferred embodiment of the power supply of the logic controller.

The storage means comprise at least one condenser C2 integrated into the power supply 2, as can be seen from the wiring diagram of the power supply 2 illustrated in FIG. 3. In particular from the wiring diagram of the power supply 2 it can be noted that the condenser C2 along with the condenser C1 aims to supply electrical energy for the low power supply voltage of the electronic board, set by way of example as mentioned to +5V, for the entire amount of time needed for the deviator 6 to pass from machine deactivation status (FIG. 2) to activation status (FIG. 1) from when the button that closes the switch 9 is activated.

Normally, in traditional systems, the function of the condensers C1 and C2 is performed by a transformer that lowers the high input voltage to make it compatible with the low output voltage. However, a transformer is not able to store energy as the condensers C1 and C2 do, therefore, should a transformer be lacking the high input voltage, the low output voltage would immediately also be lacking and therefore an interruption to the electric power supply of the logic controller would arise, which would stop working. The legislation applicable to coffee machines for this type of applications states that the power supply (2) must perform its function for a period of time of 10 ms of the high input voltage lacking. With the solution implemented in this patent, a period of 3 times longer than that required by reference legislation can be easily obtained, hence guaranteeing the solid operation of the solution.

The operation of the control circuit is as follows.

The power supply 2 can provide the correct low electric power supply voltage to the logic controller 1 in a first case if the deviator 6 is in the status indicated in FIG. 1 or in a second case if the deviator 6 is in the status indicated in FIG. 2 and the button is pressed which closes the reactivation switch 9. In the first case the high voltage at the terminals of phases L1, L2 reaches the power supply 2 through the power supply circuit 7, in the second case through the power supply circuit 8.

When the logic controller 1 is supplied by the low power supply voltage of the power supply 2, it switches the deviator 6 into the status indicated in FIG. 1 so that the machine can dispense heated brewing water when the user, through a relevant button, closes the switch 3.

The logic controller 1 monitors the switch 3 and when it verifies that the switch 3 is open, it starts to measure the time for which the switch 3 is in this status.

If the time for which the switch 3 is in the open status exceeds a pre-established value, then the logic controller 1 takes the deviator 6 into the status illustrated in FIG. 2 and the machine switches off.

If, while the control circuit is in the configuration of FIG. 2 which corresponds to the machine switching off, the user presses the button for an instant, which closes the switch 9, then for an instant the high voltage through the supply circuit 8 reaches the power supply 2 which supplies the logic controller 1 which in turn immediately switches the status of the deviator 6 bringing it back into the status illustrated in FIG. 1. The machine is therefore on again.

When the machine is on, the logic controller 1 also monitors the status of the reactivation switch 9 and, if the user through the button closes it for an instant, then it brings the deviator 6 back into the configuration of FIG. 2 hence switching off the machine even if the time for which the switch 3 is in the open status has not yet exceeded the pre-established value for the automatic turn-off.

The control circuit as conceived herein is susceptible to many modifications and variations, all falling within the scope of the invented concept; furthermore, all the details are replaceable by technically equivalent elements.

The materials used, as well as the dimensions, may in practice be of any type according to requirements and the state of the art.

The invention claimed is:

1. An automatic coffee machine having a control circuit for self-turn-off and a brewing water circulation pump, the automatic coffee machine being connectable to a domestic voltage power line and comprising:
   a logic controller having a low supply electric voltage;
   a power supply of the logic controller;
   at least one control switch to control at least the brewing water circulation pump, said at least one control switch being connected to the logic controller, and being activatable by a manual activation button of the automatic coffee machine;
   an electrically actuated deviator connected to the logic controller and switchable between:
      a machine activation status, where the electronically actuated deviator connects a main electric power line of the power supply of the logic controller to the domestic voltage power line, where at least the brewing water circulation pump is operated by the at least one control switch, and
      a machine deactivation status, where the electrically actuated deviator connects a secondary electric power line of the power supply of the logic controller to the domestic voltage power line, said secondary electric power line having a reactivation switch, separate from the at least one control switch, activatable by a manual reactivation button of the automatic coffee machine, separate from the manual activation button, the reactivation switch being normally open when the automatic coffee machine is turned on, the reactivation switch being connected to the logic controller,
   where, in the machine deactivation status, the control circuit, the brewing water circulation pump, the logic controller, and the power supply for the logic controller, of the automatic coffee machine are disconnected from the domestic voltage power line when the reactivation switch is open, whether the manual activation switch is open or closed, and where the manual reactivation button of the automatic coffee machine is activatable to turn the automatic coffee machine on and off; and
   at least one condenser to maintain the power supply of the logic controller for an entire operating time of a switching of the electrically actuated deviator from the machine deactivation status of the machine activation status, said switching of the electrically actuated deviator being automatically generated by closure of the reactivation switch.

2. The automatic coffee machine of claim 1, wherein said logic controller switches said electrically actuated deviator from the machine activation status to the machine deactivation status at an end of a pre-set period of time in the activation status of said at least one control switch.

3. The automatic coffee machine of claim 1, wherein the at least one condenser is provided within said power supply of the logic controller.

4. The automatic coffee machine of claim 1, wherein said logic controller comprises an electronic board having the low supply electric voltage suitable for monitoring a machine operation by reading a status of said at least one control switch.

5. The automatic coffee machine of claim 1, wherein said deviator comprises a two-position relay.

6. The automatic coffee machine of claim 1, wherein said electrically actuated deviator comprises and electronic triac power circuit for an alternating voltage.

7. The automatic coffee machine of claim 1, wherein said manual reactivation button is a single unipolar button.

8. The automatic coffee machine of claim 1, wherein said logic controller switches said electrically actuated deviator from the machine activation status to the machine deactivation status if, before an end of a pre-set period of time in an open status of the at least one control switch, said reactivation switch is closed.

9. A control circuit for self-turn-off of an automatic coffee machine, and for control of a brewing water circulation pump, the control circuit connectable to a domestic voltage power line, comprising:

a logic controller having a low supply electric voltage;

a power supply of the logic controller;

at least one control switch to control at least a brewing water circulation pump, said at least one control switch being connected to the logic controller, and being activatable by a manual activation button of the automatic coffee machine;

an electrically actuated deviator connected to the logic controller and switchable between:

a machine activation status, where the electrically actuated deviator connects a main electric power line of the power supply of the logic controller to a domestic voltage power line, where at least the brewing water circulation pump is operated by the at least one control switch, and a machine deactivation status, where the electrically actuated deviator connects a secondary electric power line of the power supply of the logic controller to the domestic voltage power line, said secondary electric power line having a reactivation switch, separate from the at least one control switch, activatable by a manual reactivation button, separate from the manual activation button, the reactivation switch being normally open when the automatic coffee machine is in an on position, the reactivation switch being connected to the logic controller, where, in the machine deactivation status, the brewing water circulation pump and the control circuit, including at least the logic controller and the power supply for the logic controller, of the automatic coffee machine are disconnected from the domestic voltage power line when the reactivation switch is open, whether the manual activation switch is open or closed, and where the manual reactivation button is activatable to turn the automatic coffee machine on and off; and at least one condenser to maintain the power supply of the logic controller for an entire operating time of a switching of the electrically actuated deviator from the machine deactivation status to the machine activation status, said switching of the electrically actuated deviator being automatically generated by closure of the reactivation switch.

* * * * *